(12) United States Patent
Winfrey

(10) Patent No.: US 12,314,532 B2
(45) Date of Patent: May 27, 2025

(54) WEB APPLICATION OF COMPONENT-BASED HMTL ORIGINATING ON SERVER

(71) Applicant: Clinton M. Winfrey, King George, VA (US)

(72) Inventor: Clinton M. Winfrey, King George, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 18/125,944

(22) Filed: Mar. 24, 2023

(65) Prior Publication Data

US 2024/0319842 A1    Sep. 26, 2024

(51) Int. Cl.
*G06F 40/151* (2020.01)
*G06F 3/04817* (2022.01)
*G06F 8/34* (2018.01)
*G06F 8/51* (2018.01)

(52) U.S. Cl.
CPC ............ *G06F 3/04817* (2013.01); *G06F 8/34* (2013.01); *G06F 8/51* (2013.01); *G06F 40/151* (2020.01)

(58) Field of Classification Search
CPC .................................................. G06F 3/04817
See application file for complete search history.

(56) References Cited

U.S. PATENT DOCUMENTS

| | | | |
|---|---|---|---|
| 2011/0016449 A1* | 1/2011 | Yao | G06F 9/547 717/106 |
| 2013/0219263 A1* | 8/2013 | Abrahami | G06F 16/9577 715/234 |
| 2014/0282257 A1* | 9/2014 | Nixon | G06F 3/04817 715/835 |
| 2015/0127312 A1* | 5/2015 | Winfrey | G06F 30/20 703/6 |
| 2018/0152450 A1* | 5/2018 | Chasman | H04L 63/10 |
| 2018/0285328 A1* | 10/2018 | Pivato | G06F 16/958 |
| 2018/0302346 A1* | 10/2018 | Xie | H04L 67/02 |
| 2019/0065157 A1* | 2/2019 | Varadarajan | G06F 8/34 |
| 2021/0019023 A1* | 1/2021 | Creager | G06F 3/0481 |
| 2021/0240818 A1* | 8/2021 | Seksenov | G06F 16/986 |
| 2022/0027169 A1* | 1/2022 | Burman | G06F 8/77 |
| 2022/0083523 A1* | 3/2022 | Ben-Aharon | G06F 8/34 |
| 2022/0269738 A1* | 8/2022 | Stone | G06F 3/0482 |
| 2022/0334809 A1* | 10/2022 | Stone | G06F 16/958 |

* cited by examiner

*Primary Examiner* — Tuyetlien T Tran
(74) *Attorney, Agent, or Firm* — Gerhard W. Thielman

(57) ABSTRACT

A computer-implemented method is provided for translating a program instruction from a server to a client having a graphical user interface (GUI). The method storable on a computer-readable medium includes defining a component via the server that includes at least one layout, which the GUI renders as an icon; creating the component within a layer responsive to the client submitting the program instruction; and rendering the icon on the GUI for the client.

5 Claims, 18 Drawing Sheets

```
@Override
public String toHtml() {
    return "<button id='" + getId() + "' type='button' "
        + "onclick=\"changed" + layoutId + "({id: '" + getId() +
"', value: '#buttonclick'});\">" + value + "</button>";
}
```
⎱ 300
⎰ 310

FIG. 3A

```
changed[masterLayoutId]({id: '[buttonUniqueId]', value:
'#buttonclick'});
```
320

FIG. 3B

```
<o:commandScript name="changed#{cc.attrs.layout.id}"
action="#{layout.fireEvent(cc.attrs.layout)}"/>
```
330

FIG. 3C

```
<o:socket channel="socketChannel" scope="view"
onmessage="function(message) { eval(message); }"/>
```
340

```
@Inject @Push private PushContext socketChannel;
```

FIG. 3D

```
socketChannel.send("$('#" + button.getId() +
"').html('Button Text');");
```
350

FIG. 3E

```
                                                              ┌─ 400
<?xml version="1.0" encoding="UTF-8"?>
<!DOCTYPE html PUBLIC "-//W3C//DTD XHTML 1.0 Transitional//EN"
    "http://www.w3.org/TR/xhtml1/DTD/xhtml1-transitional.dtd">
<html xmlns="http://www.w3.org/1999/xhtml"                    ⎫
    xmlns:composite="http://java.sun.com/jsf/composite"       ⎪
    xmlns:h="http://xmlns.jcp.org/jsf/html"                   ⎬ 420
    xmlns:o="http://omnifaces.org/ui">                        ⎪
                                                              ⎭

<composite:interface>                                     ⎫
        <composite:attribute name="layout"                    ⎪
type="gov.mil.navy.nswcdd.tf.components.layout.Layout"        ⎪
required="true"/>                                             ⎬ 430
        <composite:attribute name="margin"                    ⎪
type="java.lang.String"/>                                     ⎪
    </composite:interface>                                    ⎭

<composite:implementation>                                ⎫
        <o:commandScript name="changed#{cc.attrs.layout.id}"  ⎪
action="#{layout.fireEvent(cc.attrs.layout)}"/>               ⎪
        <h:panelGroup id="#{cc.attrs.layout.id}"              ⎪
style="display:block">                                        ⎬ 440
            <h:outputText                                     ⎪
value="#{layout.getHtml(cc.attrs.layout)}" escape="false"/>   ⎪
        </h:panelGroup>                                       ⎪
    </composite:implementation>                               ⎭
</html>
```

FIG. 4A

```
package gov.mil.navy.nswcdd.tf.view;
```
← 410

```
import gov.mil.navy.nswcdd.tf.components.layout.Layout;
import gov.mil.navy.nswcdd.tf.tools.TFTools;
import java.io.Serializable;
import javax.faces.context.FacesContext;
import javax.faces.view.ViewScoped;
import javax.inject.Named;
```
⎬ 450

```
/**
 * The view for the layout.xhtml composite component
 */
@Named(value = "layout")
@ViewScoped
public class LayoutView implements Serializable {
```
⎬ 460

```
    /**
     * Generates the HTML to represent this Layout
     *
     * @param layout the Layout we're representing
     * @return the HTML that was generated
     */
    public String getHtml(Layout layout) {
        //needs to init with itself as the master layout, which
will recursively init everything in it
        layout.init(layout.getId(), layout.pushContext);

//return the HTML that is produced by calling "toHtml"
        return layout.toHtml();
    }
```
⎬ 470

FIG. 4B

```
/**
 * The user has triggered an event
 *
 * @param layout this thing contains the component that
actually changed
 */
    public void fireEvent(Layout layout) {
        String componentId =
FacesContext.getCurrentInstance().getExternalContext().getRequest
ParameterMap().get("id");
        String value =
FacesContext.getCurrentInstance().getExternalContext().getRequest
ParameterMap().get("value");
        layout.fireEvent(componentId, value);
    }

```
    changed[masterLayoutId]({id: '[buttonUniqueId]', value:
'#buttonclick'});
```

FIG. 5B

```
/**
 * Finds the component by the given ID and fires an event      ⎯ 600
 *
 * @param layout the owner of the component
 * @param componentId the ID of the component
 * @param value the new value to fire for the event
 * @return true if we found it, otherwise false; we do this so we can
 * recursively call and stop as soon as we find the right component
 */
private boolean findComponentAndFireEvent(Layout layout, String componentId, String value) {
    for (Dialog dialog : layout.dialogs) {
        if (dialog.getId().equals(componentId)) {
            dialog.close(); //found it, stop looking
            return true; //found it, stop looking
        } else if (findComponentAndFireEvent(dialog.content, componentId, value)) {
            return true; //found it, stop looking
        }
    }
    for (TFComponent component : layout.getComponents()) {
        if (component instanceof ListBox && ((ListBox) component).getId().equals(componentId)) {
            ((ListBox) component).fireEvent(value);
            return true; //found it, stop looking
        } else if (component instanceof DropButton && ((DropButton) component).menu.getId().equals(componentId)) {
            ((DropButton) component).menu.fireClickEvent(value);
```

FIG. 6A 630 brace encompasses the first `for (Dialog dialog...)` block.
640 brace encompasses the second `for (TFComponent component...)` block.

```
            return true; //found it, stop looking
        } else if (component instanceof ValueComponent &&
component.getId().equals(componentId)) {
            if (value.startsWith("#buttonclick")) {
                ((Button) component).fireClickEvent();
                return true; //found it, stop looking
            } else {
                ((ValueComponent)
component).setValueInServer(value);
                return true; //found it, stop looking
            }
        } else if (component instanceof Tabs) {
            if (component.getId().equals(componentId)) {
                ((Tabs) component).fireTabEvent(value);
                return true; //found it, stop looking
            } else if (((Tabs)
component).plusMenu.getId().equals(componentId)) {
                ((Tabs)
component).plusMenu.fireClickEvent(value);
                return true; //found it, stop looking
            } else if (((Tabs)
component).tabMenu.getId().equals(componentId)) {
                ((Tabs)
component).tabMenu.fireClickEvent(value);
                return true; //found it, stop looking
            } else {
                for (Tabs.Tab tab : ((Tabs) component).tabs)
{
                    if (findComponentAndFireEvent(tab.layout,
componentId, value)) {
                        return true; //found it, stop looking
```

610 points to top block. 650 brace covers the ValueComponent block. 660 brace covers the Tabs.getId block. 670 brace covers plusMenu/tabMenu blocks. 680 brace covers the for loop block.

FIG. 6B

```
                    }
                }
            }
        } else if (component instanceof Layout &&
findComponentAndFireEvent((Layout) component, componentId,
value)) {
                    return true; //stop looking, we found and updated
recursively!
                }
            }
        }
        return false;
    }
```
— 620
— 690

FIG. 6C

```
/**                                                         /— 700
 * Add components to this layout, starting at the given index
 *
 * @param index the place to put these components
 * @param components the TFComponents to add
 */
@Override
public void add(int index, List<TFComponent> components) {
    if (isRendered()) { //only bother with updating the html if
its "toHtml" method has already been drawn
        StringBuilder sb = new StringBuilder();

//make the html that will be added
        for (int i = 0; i < components.size(); i++) {
            sb.append("<td style=\"padding:0 0 0 " + (index == 0
&& i == 0 ? "0" : hSpacing + "px") +
";\">").append(components.get(i).toHtml()).append("</td>");
        }
```
— 720
— 730

FIG. 7A

```
        //if adding at index 0, then the old first element needs
padding now                                               ┌─710
        String padOldFirstElement = "";
        if (index == 0 && !this.components.isEmpty()) {    ⎫
            padOldFirstElement = "$('#table" + getId() + " > ⎪
tbody > tr > td').eq(0).css('padding-left', '" + hSpacing + ⎬─740
"px');\n";                                                 ⎪
        }                                                   ⎭

//execute adding the components to the HTML          ⎫
        String html = sb.toString().replace("#LAYOUT_ID#",   ⎪
layoutId).replace("\"", "\\\"").replace("\n", "");           ⎪
        TFTools.execute(pushContext, padOldFirstElement +    ⎪
"$('#table" + getId() + " > tbody > tr" + (index == 0 ? "" : " > ⎬─750
td") + "')" + (index == 0 ? "" : ".eq(" + index + "-1)") + "." + ⎪
(index == 0 ? "prepend" : "after") + "(\"" + html + "\");");  ⎪
        TFTools.initToolTips(components);                    ⎪
    }                                                        ⎭

//these newly added components need to all be initialized so ⎫
they can send/receive events                                    ⎪
    for (int i = 0; i < components.size(); i++) {              ⎬─760
        components.get(i).init(layoutId, pushContext);          ⎪
    }                                                           ⎭

//and finally, we need to add the components on the java side ⎫
so it matches the client side                                    ⎬─770
    this.components.addAll(index, components);                   ⎪
}                                                                ⎭
```

FIG. 7B

```
 * Remove these components (as a List) from the layout
 * @param components the components to remove
 */
@Override
public void remove(List<TFComponent> components) {
    List<Integer> indices = new ArrayList<>();
    for (TFComponent component : components) {
        if (!this.components.contains(component)) {
            continue;
        }
        indices.add(this.components.indexOf(component));
    }
    if (indices.isEmpty()) {
        return; //there's nothing to actually remove
    }
    this.components.removeAll(components);
    if (isRendered()) { //we actually need to remove this from the DOM, too
        Collections.sort(indices, Comparator.reverseOrder());
        StringBuilder sb = new StringBuilder();
        for (Integer index : indices) {
            sb.append("$('#table" + getId() + " > tbody > tr > td').eq(" + index + ").remove();\n");
        }
        if (!this.components.isEmpty()) {
            sb.append("$('#table" + getId() + " > tbody > tr > td').eq(0).css('padding-left', '0px');\n");
        }
        TFTools.execute(pushContext, sb.toString());
    }
}
```

```
for (Dialog dialog : layout.dialogs) {
    if (dialog.getId().equals(componentId)) {
        dialog.close(); //found it, stop looking
        return true; //found it, stop looking
    } else if (findComponentAndFireEvent(dialog.content, componentId, value)) {
        return true; //found it, stop looking
    }
}
```
⟵ 900

FIG. 9A

```
<t:layout layout="#{tf.layout}"/>
```
⟵ 910

FIG. 9B

```
VBox layout = new VBox();
layout.add(new Button("Say Hi", action -> {
    layout.add(new Label("Hello World!"));
}));
```
⟵ 920

FIG. 9C

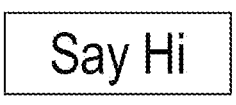

Hello World!
Hello World!
Hello World!

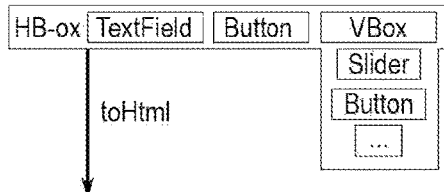

- HBox is the master layout
- Its "toHtml" method is called, which then calls the "toHtml" method for all child components and includes them in a single String;
    <table id='hbox1214'><tr><td>[TextField.toHtml],/td><td>[Button.toHtml]</td><td>[Vbox.toHtml]<td>
- Note that VBox has child components as well
    - Its toHtml method will do exactly what the HBox's method did, composing a string by calling its child components' toHtml methods
- Each Component keeps track of its unique ID that is on the client side
    - This simplifies dynamically adding/removing a Component; for example, jQuery and similar libraries make it easy to add/remove a cell in a table

FIG. 11

```
<o:commandScript name="changed#{cc.attrs.layout.id}"
action="#{layout.fireEvent(cc.attrs.layout)}"/>
```

FIG. 12A

```
<o:socket channel="socketChannel" scope="view"
onmessage="function(message) { eval(message); }"/>
```

FIG. 12B

```
public interface WachosPlugin extends OsmPlugin {
    public String getTitle();
    public Layout createLayout(Session session);
}
```

FIG. 13

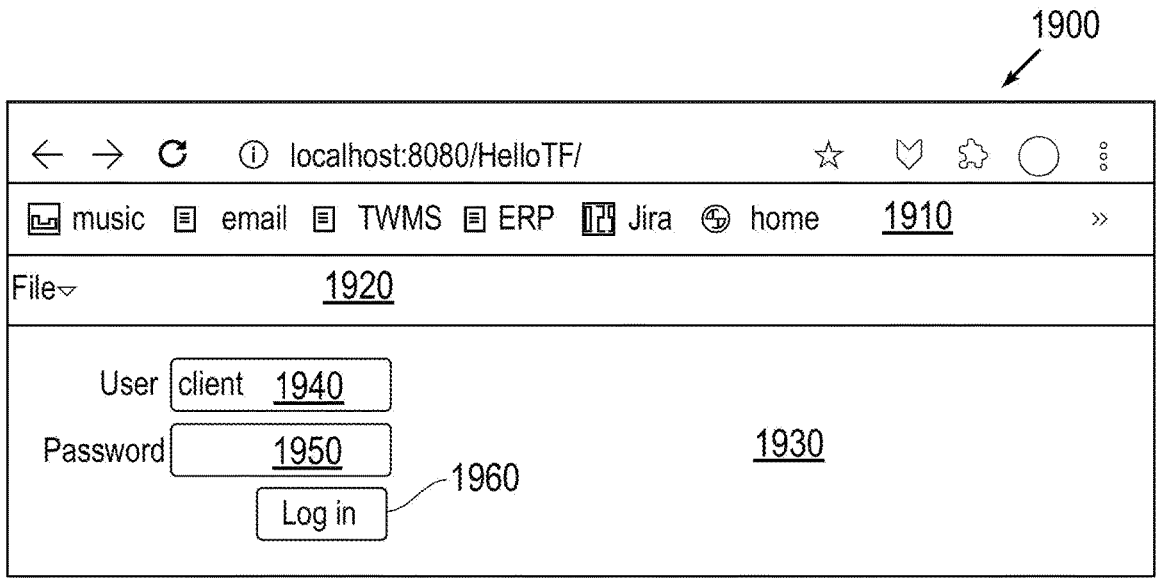

FIG. 19

```
//add item to menu bar
Menu file = new Menu("File");
file.add(new MenuItem("Toast", "Tells the user something",
        action -> toastr.success("Hi!", "You toasted")));
menubar.add(file);

//login example
TextField user = new TextField("clint");
PasswordField password = new PasswordField("");
layout.add(new VBox(new HBox(new Label("User"), user).alignRight(),
    new HBox(new Label("Password"), password).alignRight(),
    new HBox(new Button("Log in", "", ok -> {
        layout.removeAll();
        layout.add(new Label("You logged in"));
    }).alignRight()).alignRight()));
```

FIG. 20

WEB APPLICATION OF COMPONENT-BASED HMTL ORIGINATING ON SERVER

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to generation of applications for Internet operation. In particular, the invention relates to translating instructions from a user (e.g., software developer) to a server with minimal program ability by the user. The Internet as accessed via the server displays audio-visual content on graphical user interface (GUI) display monitors using hypertext markup language (HTML) protocols.

Background: There are web docking frameworks such as wcDocker, golden-layout, and many others. These frameworks are designed to implant hypertext markup language (HTML) components into panels and enable operators to organize those panels as they see fit. None of the conventional docking frameworks is plugin-based, and none is designed to enable each graphical user interface (GUI) module to be written entirely as code in a backend language, such as Java.

"Liferay Portal" provides a plugin-based approach for adding JavaServer Faces (JSF) portlets. However, Liferay is not designed to provide portlets in a docking framework, but instead has the operator deploy each portlet to the web application for access from the web's user side. No conventional option enables a programmer to develop a web GUI as a plugin entirely in Java with no additional extended HTML (XHTML) for loading dynamically in a web application.

SUMMARY

Conventional client instruction to server operations yield disadvantages addressed by various exemplary embodiments of the present invention. In particular, various exemplary embodiments provide a computer-implemented method for translating a program instruction from a server to a client having a graphical user interface (GUI). The method storable on a computer-readable medium includes defining a component via the server that includes at least one layout, which the GUI renders as an icon; creating the component within a layer responsive to the client submitting the program instruction; and rendering the icon on the GUI for the client.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIGS. 3A, 3B, 3C, 3D and 3E are separate code segment views of code instructions in appropriate languages;

FIGS. 4A and 4B are code segment views and XML instructions;

FIGS. 5A and 5B are code segment views of operator prompted responses prompted;

FIGS. 6A, 6B and 6C are code segment views of parameters for executing an event;

FIGS. 7A and 7B are code segment views of component rendering;

FIG. 8 is a code segment view of removing and appending indices;

FIGS. 9A, 9B and 9C are code segment views of dialog box construction;

FIG. 10 is a plugin view of the label as displayed from instructions in the dialog box;

FIG. 11 is a plugin view of an HTML menu with element selection for component rendering;

FIGS. 12A and 12B are code segment views of command script and socket channel instructions;

FIG. 13 is a code segment view of string and layout retrieval;

FIG. 19 is a windows view of a login field; and

FIG. 20 is a code segment view of the login field instructions.

DETAILED DESCRIPTION

Figure 1:
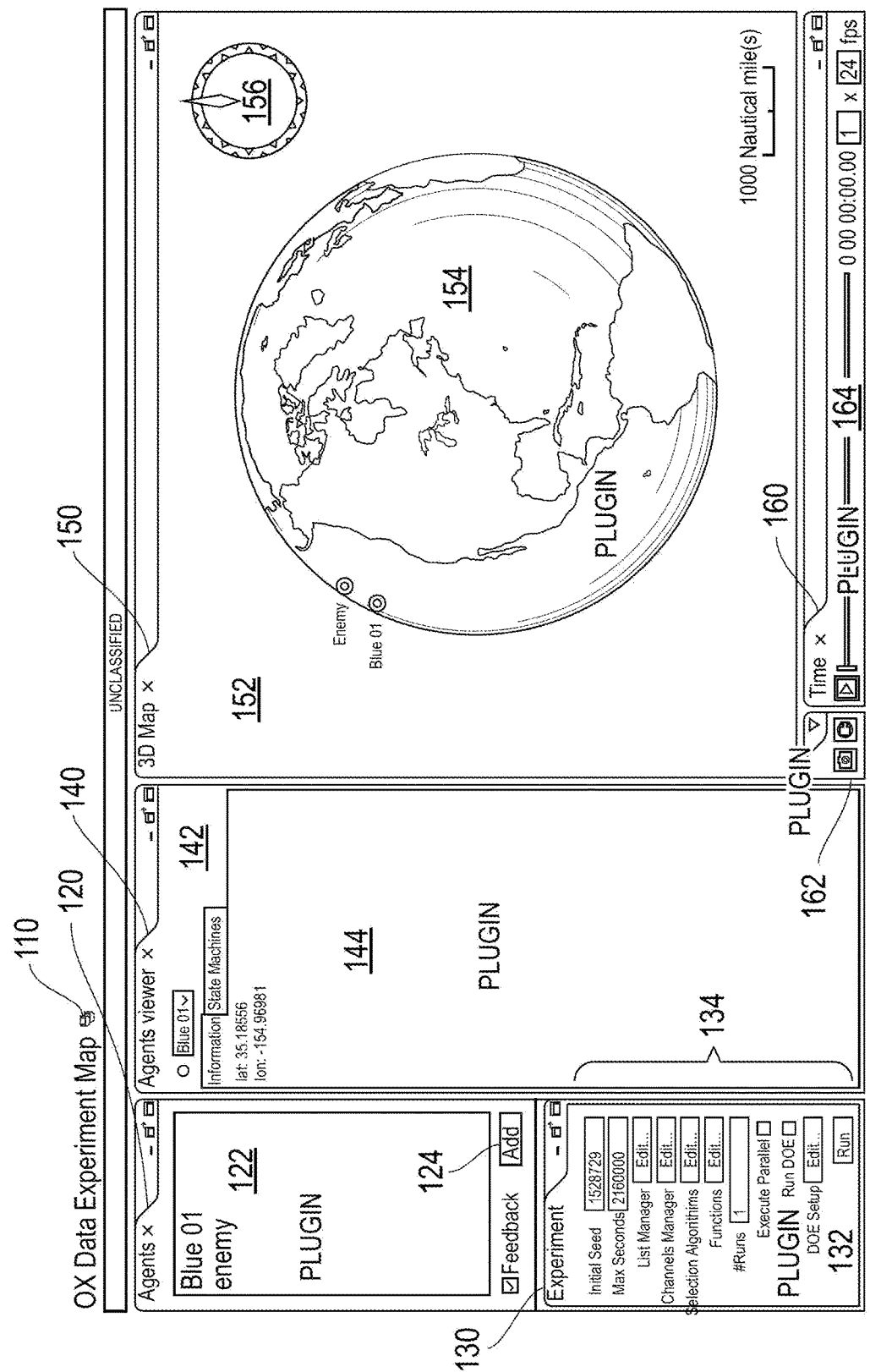
FIG. 1 is a GUI display view of a globe window with plugins.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, artisans of ordinary skill will readily recognize that devices of a less general purpose nature, such as hardwired devices, may also be used without departing from the scope and spirit of the inventive concepts disclosed herewith. General purpose machines include devices that execute instruction code. A hardwired device may constitute an application specific integrated circuit (ASIC), a field programmable gate array (FPGA), digital signal processor (DSP) or other related component.

Various abbreviations common to the software field appear in this disclosure. These include the following:
AJAX—asynchronous Javascript and XML
API—application programming interface
CSS—cascading style sheets
DOM—document object model
GUI—graphical user interface
HTML—hypertext markup language
JSF—JavaServer Faces
URL—uniform resource locator (i.e., web address)
XML—extended markup language When programmers enter web application development, they are presented with the daunting task of learning many different client-side technologies: HTML, CSS, JavaScript, AJAX, web sockets, etc. Often, a client-side framework is used (Angular, React, Vue). In addition, there is a server-side language (e.g., Java, C #, etc.) that handles the business logic, as well as a potential server-side framework (e.g., Spring, JSF). Many people become frustrated and give up when trying to learn all of the necessary technologies. The industry conventionally lacks a readily available tool for imparting instructions by a user client to a server absent extensive programming knowledge.

As a developer, the inventor had an end goal of converting a Java desktop application to the web. This desktop platform application was written with the Java Swing API using a plugin framework to insert GUI widgets into a docking framework. Something that felt familiar—e.g., GUI code written in Java was also sought. The Vaadin framework seemed promising. In Vaadin, one can write code that looks similar to Java Swing to produce HTML.

However, several issues impeded progress. One was performance; it seemed that as more elements were added, the web application became less responsive. Another was expandability—i.e., inability to integrate a docking framework such as wcDocker into a Vaadin application. Ultimately, security incompatibility led to disapproval of Vaadin on the Navy's DOM Application and Database Management System (DADMS) list.

Embodiments were created by writing a similar capability to Vaadin, using the JSF framework as the foundation. The resulting library became known as "TaserFaces", which enabled Java Swing-like code to dynamically generate elements in JSF—a notoriously difficult HTML/Java paradigm that is nearly impossible to do dynamic applications with. Code written in TaserFaces would fit seamlessly into an existing JSF application.

Various exemplary embodiments provide for Web Application of Component-based HTML, Originating on Server (WACHOS) to provide Java instructions that create HTML/JavaScript for the operator. In particular, Java code is all on the server side. JavaScript code is on the client side (executed on the user's web browser).

The initial TaserFaces implementation had limitations that WACHOS is meant to address. With the WACHOS embodiments, things are fast. In addition, the design is easy to port to another programming language. And most important in this case, WACHOS simplifies implementation of a plugin-based architecture that enables independently developed GUI code to be joined in a docking framework such as "wcDocker" (found on GitHub). No approach has been observed where one can dynamically compose anything similar for a web application.

WACHOS is based on earlier implementations. The initial TaserFaces implementation denotes one such prior implementation developed at Naval Surface Warfare Center—Dahlgren. The TaserFaces prototype actually applies JSF and wcDocker, although this characteristic is merely exemplary. The novelty of WACHOS lies in the unique approach of enabling backend code to be written as:
(1) a single application, or
(2) as at least one module that can be dynamically loaded into a docking framework.

As an example, one might port a Java "Swing" application to the web, and as such something more akin to Swing would be needed than merely applying traditional web technologies. In addition to that paradigm, the WACHOS application employs desktop GUI plugins that are defined separately and combined into a unified application via a docking framework. Note that each widget is a GUI plugin, as defined in the Orchestrated Simulation through Modeling (OSM) framework as described in U.S. Pat. No. 9,514,254.

WACHOS is a library composed of two main purposes:
(a) to enable a web developer to create graphical user interface (GUI) plugins written entirely in Java and display them in a docking framework, and
(b) enable a developer to create an AJAX—and socket-enabled user interface in JavaServer Faces (JSF) while almost completely removing the need to understand asynchronous Javascript and XML (AJAX), sockets, or any other web technologies such as JavaServer Faces (JSF)—and instead make web GUI development feel like JavaFX, Swing, or Vaadin.

FIG. 1 shows a GUI display view 100 of a data experiment map 110 within a golden-layout web docking framework. The display includes tabs with windows and dialog boxes. An Agents tab 120 provides a plugin window 122 and an Add button 124. An Experiment tab 130 includes a list 132 of dialog boxes for parameter selection. An Agent Viewer tab 140 includes a menu 142 and a plugin window 144.

A three-dimensional (3D) Map tab 150 includes a plugin window 152 featuring a globe 154 and an orientation marker 156. A Time tab 160 includes a menu plugin 162 and an input plugin 164. Each widget is a GUI plugin, as defined in the OSM framework. The goal is to convert all GUI elements to the web. Although generally, "widget" constitutes a broad term, in context of this disclosure, it refers to a GUI element.

Figure 2:
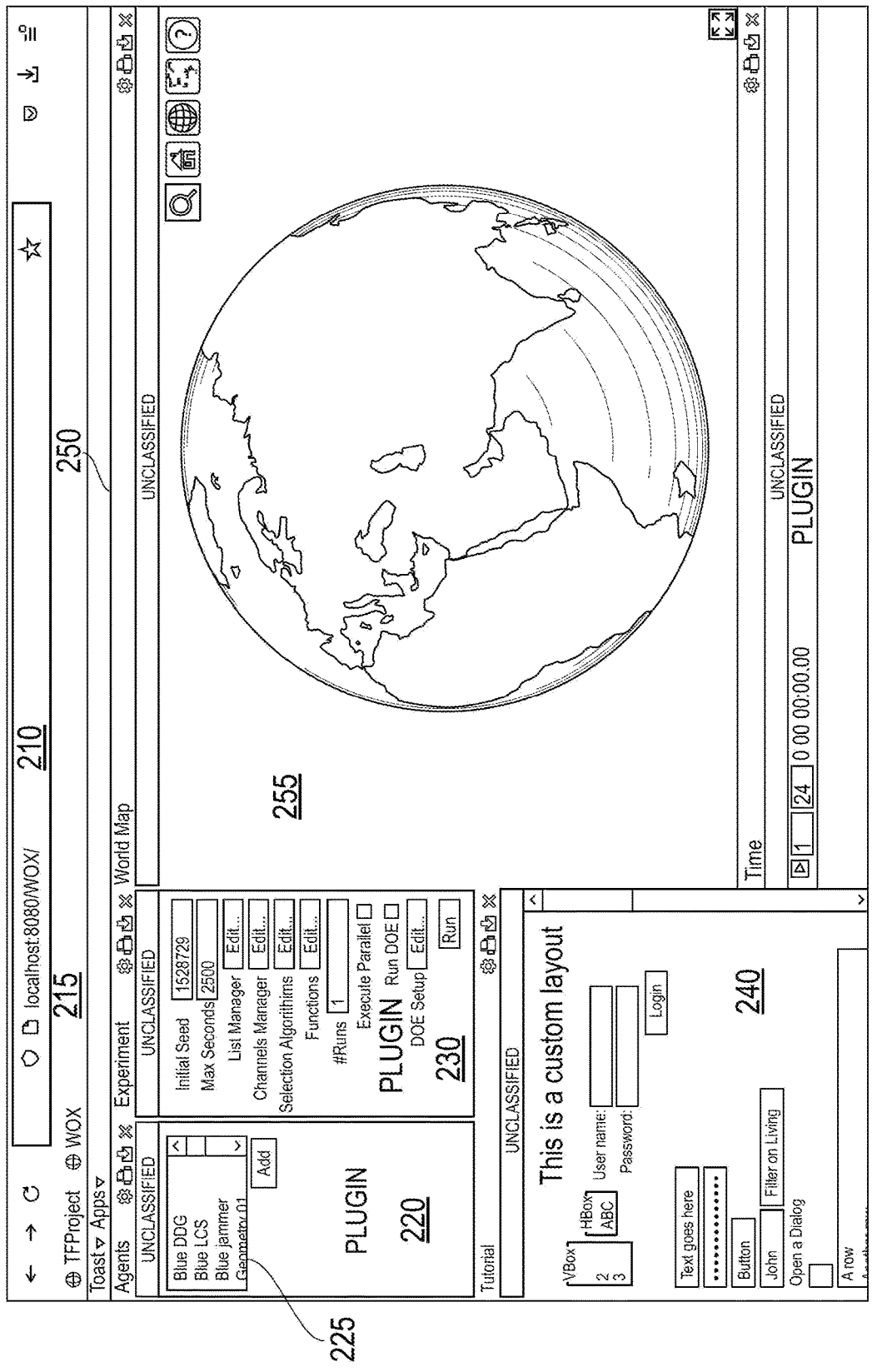
FIG. 2 is a GUI display view of a globe window with plugins.

FIG. 2 shows a GUI display view 200 of a localhost widget 210 as a GUI plugin 215 using the OSM patent '254 for Modular Model and Simulation Architecture. Several windows are displayed. These include Agents plugin 220 with selections 225, Experiment plugin 230 with dialog boxes, Tutorial plugin 240 with a custom layout, World Map plugin 250 featuring a globe 154, and a Time plugin 260 with elapse chronometer.

In order to port a Java Swing application to the web, one must use something more akin to Swing than the traditional web technologies. In addition to that paradigm, WACHOS employs desktop GUI plugins that are defined separately and combined into a unified application via a docking framework. Each widget constitutes a GUI plugin. OSM defines techniques to produce and handle plugins for Modeling and Simulation. WACHOS defines how to produce GUI plugins for the web. The desktop application to be segmented is shown in view 100. The objective is to convert all GUI elements to the web similar to display view 200 built via a plugin framework.

In order to port this Java-based tool to the web, two candidate technologies were found that might aid: Vaadin and JSF. In Vaadin, one can write code that resembles Java Swing or JavaFX. Its component-level application programming interface (API) constitutes an objective, as far as building a web application entirely in Java. However, the client's Document Object Model (DOM) cannot be accessed to incorporate modifications. In addition, there is no clear way to integrate a docking framework, let alone create plugins for one.

An earlier attempt at solving the problem called TaserFaces resulted in further development. This effort was specific to JSF and far more complicated than the WACHOS embodiment. Essentially, TaserFaces used ui:repeat in order to generate every Component in a corresponding Layout. Creating a new Component type required creating an XHTML piece and an associated view that would then be added to the ui:repeat loop. An AJAX call was made for every generated Component in the Layout. This produced an enormous amount of code on the client side.

TaserFaces was tightly coupled with JSF, whereas the WACHOS approach to the problem is generic and can be applied to other technologies. The exemplary WACHOS is far easier to understand than TaserFaces and much more efficient. It's easier to understand for someone who is actually implementing WACHOS. The code that an operator of WACHOS would write does not differ much from TaserFaces, but provides an enormous increase in performance over TaserFaces.

In JSF, one cannot write code that looks like Java Swing or JavaFX. Note that JSF doesn't typically access the client's DOM for implementing modifications. By contrast, WACHOS creates a server-side Component, which recognizes the accompanying DOM identification generated on the client side. The limitation of the TaserFaces approach was being specific to JSF, and lack of efficiency. The WACHOS embodiment is not specific to JSF (or even Java), and it is very efficient. All interactions appear to be immediate. The WACHOS technique to Component creation is unique. In addition, WACHOS defines a unique approach to a docking framework populated by independently developed GUI plugins.

Description and Operation: WACHOS defines a pattern to create a server-side component library that enables development of GUI code, exclusively on the server side. This pattern functions for any object oriented programming language. One could employ JSF in the proof of concept. However, this idea could be ported to other frameworks and languages. The pattern is defined as described in the following paragraphs and in relation to FIGS. 3A, 3B, 3C, 3D and 3E, which show text views 300 of code instructions in appropriate languages.

Example code to generate a Button in HTML is shown in FIG. 3A as HTML code 310. There are some important things to note in this Button:

AJAX The "onclick" method defines what happens when the Button is clicked in the client. A cleaner version of the method that is shown in FIG. 3B as AJAX code 320. This method executes a commandScript (via AJAX) as defined in the XHTML: This is shown in FIG. 3C as XHTML code 330.

Web Socket—If the server needs to change an attribute in the client's button, it can be performed by executing a command from a web socket.

In the proof-of-concept, one can employ the web socket approach defined by OmniFaces as follows: XHTML and JSF View shown in FIG. 3D as JSF code 340. One can then accomplish something similar in Java to update the text of a Button shown in FIG. 3E as Java code 350. Exemplary embodiments also envision use of socketChannel to be passed to all Components in the Layout.

To summarize, the Button object extends the Component object. This Button object overrides the "toHtml" method and generates HTML code 310, which is passed to the client. A web socket is used to update the Button from the server side. AJAX (via commandScript in this example) is used to fire an event when the Button is clicked.

Components: One can create the "Component" object, similarly to the Component object that is defined in Java Swing, JavaFX, Vaadin, and other component libraries.

In WACHOS, everything is a Component: e.g., Label, TextField, Button, Slider, . . . , Layout.

In WACHOS, each component has a "toHtml( )" method, which creates a String of HTML.

The section for XHTML code 330 demonstrates handling events from the client to the server (i.e., a button being clicked), and code execution from the server to the client (via socket communication). In a typical JSF application, every button (or other component) would have its own commandScript. That means conventionally one must write a bunch of brittle XHTML code 330 that's difficult to maintain, and one's application will not be dynamically generated.

In a typical JSF application, sockets are used to send messages. The use of the "eval" JavaScript means that one can actually send JavaScript from the server side for execution on the client side, without even having the operator perform any task. This is secure because the code to execute comes from the server side. Another important point is that one can do really advanced things with this JavaScript, because the Java code monitors the DOM elements that have been generated on the client side.

The code segments in FIGS. 3A through 3E are explained herein.

View 310 illustrates creating a String of HTML from the WACHOS component, which will be rendered on the client's web browser.

View 320 is the JavaScript event that is generated in view 310, which calls code that is executed when the operator clicks a button. This code resides on the client side (web browser).

View 330 is the XHTML code that receives the operator's click from view 320. View 330 calls the Java fireEvent method (in FIG. 5A as segment 530), which then calls the fireEvent method on the layout in question, which then calls the findComponentAndFireEvent method (in FIG. 6A as segment 630).

View 340 illustrates a socket connection where the server can push and execute JavaScript code on the client's machine. Note the use of "eval", which simply executes the JavaScript message sent from the server. In this case, the message is always expected to be JavaScript. This is a one-way transmission from server to client—never from client to server, which would be a code injection concern.

View 350 shows how one can ".send" JavaScript code on the server side via the socket defined in view 340, which affects the client. The code in this example is going to change the text of the button to "Button Text", which one can do easily because the getId( ) method in the Java Button class knows the ID of that button on the client side. Note that view 350 is an example of changing an attribute in the client's button.

Further drawings provide context to be described subsequently. FIGS. 4A and 4B show respective code views 400 and 410 of XML instructions. View 400 features construction 420 of a JSF composite, layout and margin interfaces 430, and composite implementation 440 for output text. View 410 features an import package 450, a layout view 460 and an HTML layout generator 470. FIGS. 5A and 5B show respective code views 500 and 510 of a response prompted by an operator. View 500 features a layout code 520 with a segment for string component 530. View 510 features a segment for button change code 540.

FIGS. 6A, 6B and 6C show respective code views 600, 610 and 620 of parameters for executing an event. View 600 features a recursive Boolean instruction 630 and a component search 640. View 610 features button selection detection 650, an instance search 660 and menu response 670. View 620 features alternative instruction 680. View 630 features a recursive search 690.

FIGS. 7A and 7B show respective code views 700 and 710 of component rendering. View 700 features string-building 720 and appending 730. View 710 features adding left spacing 740, providing appendage tools 750, initializing send-and-receive events 760 and modifying Java on the server to match the client 770.

FIG. 8 shows code views 800 of removing indices 810 and appending indices 820. FIGS. 9A, 9B and 9C show respective code views 900, 910 and 920 of dialog box construction. View 900 features dialog finding; view 910 references layout; and view 920 creates a new button that provides a box and label. FIG. 10 shows a window view 1000 of the label as displayed from instructions in view 920. FIG. 11 shows a window view 1100 of an HTML menu with element selection from view 700, along with their descriptions.

Figure 14:
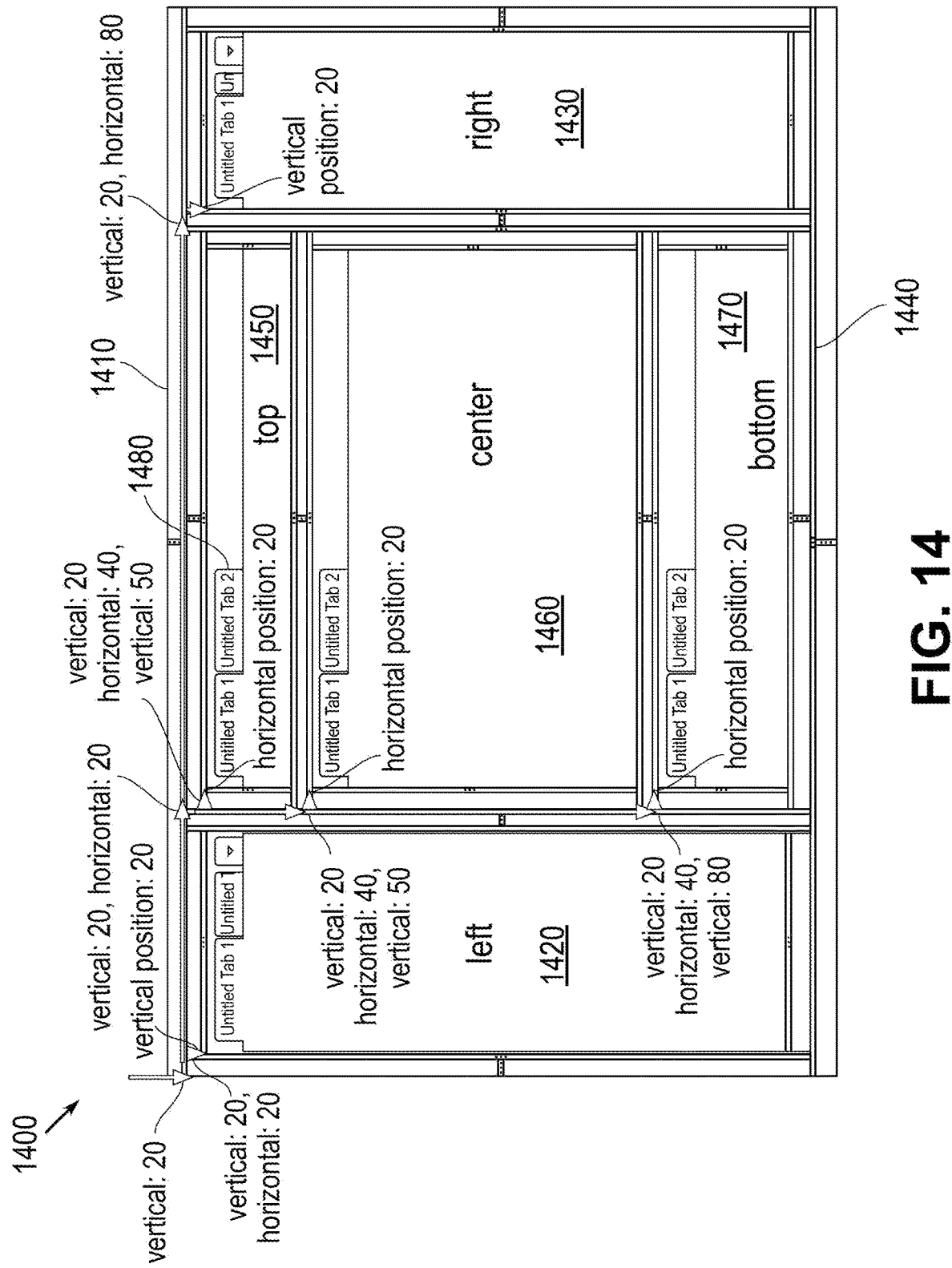
FIG. 14 is a windows view of vertical and horizontal boxes.

FIGS. 12A and 12B show respective code views 1200 and 1210 of command script and socket channel instructions. FIG. 13 shows a code view 1300 of string and layout retrieval. FIG. 14 shows a window view 1400 of vertical and horizontal boxes distributed within a screen 1410. In particular, view 1400 includes left 1420 and right 1430 display segments that flank a mid-column 1440 with top 1450, center 1460 and bottom 1470 display segments, each including a menu tab 1480 on the upper edges.

Figure 15:
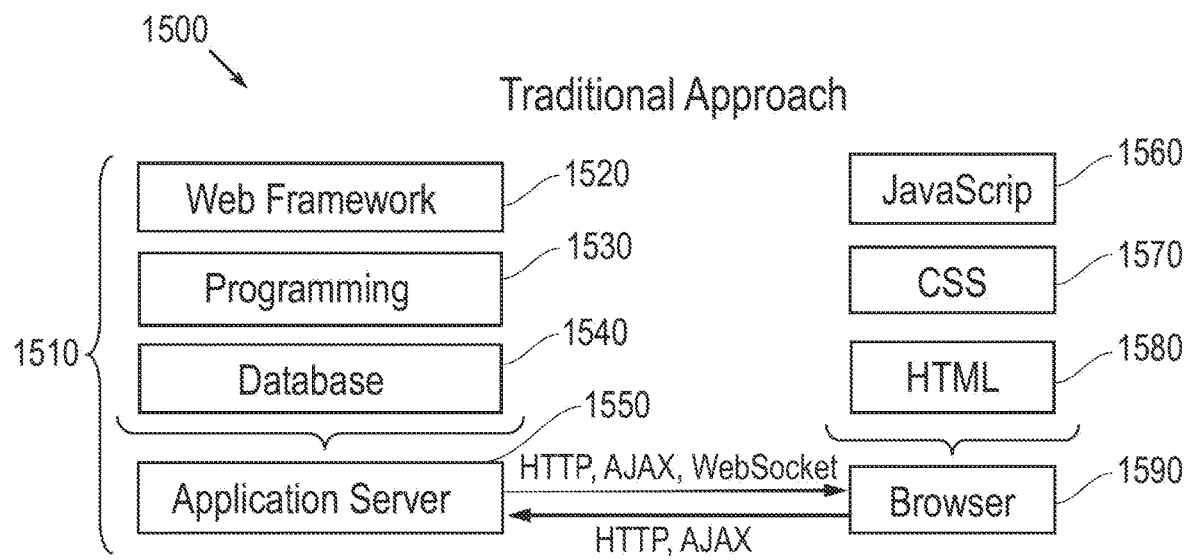
FIG. 15 is a diagram view of a traditional server-to-client interaction.

FIG. 15 shows a diagram view 1500 of a traditional approach 1510 to internet access. A web framework 1520, programming 1530, and a database 1340 feed an application server 1550. JavaScript 1560, CSS 1570 and HTML 1580 feed a client browser 1590. The server 1550 employs HTTP 1580, AJAX 320 and WebSocket to transmit information to the browser 1590, which returns HTTP and AJAX responses for updating instructions and continue receipt of information.

Figure 16:
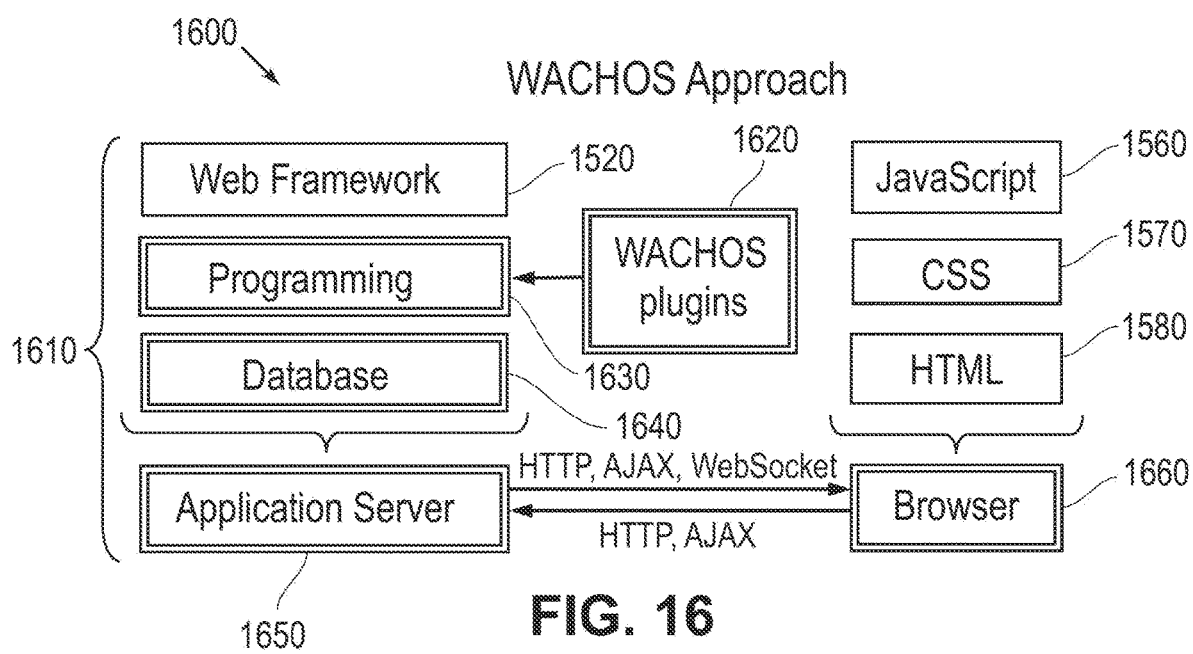
FIG. 16 is a diagram view of WACHOS server-to-client interaction.

FIG. 16 shows a diagram view 1600 of the exemplary WACHOS approach 1610 using WACHOS plugins 1620, which augments programming 1630. The web framework 1520, programming 1630 and database 1640 feed an application server 1650. JavaScript 1560, CSS 1570 and HTML 1580 instruct the browser 1660. The server 1640 sends HTTP, AJAX and WebSocket information to the browser 1660, which returns HTTP and AJAX responses.

Figure 17:
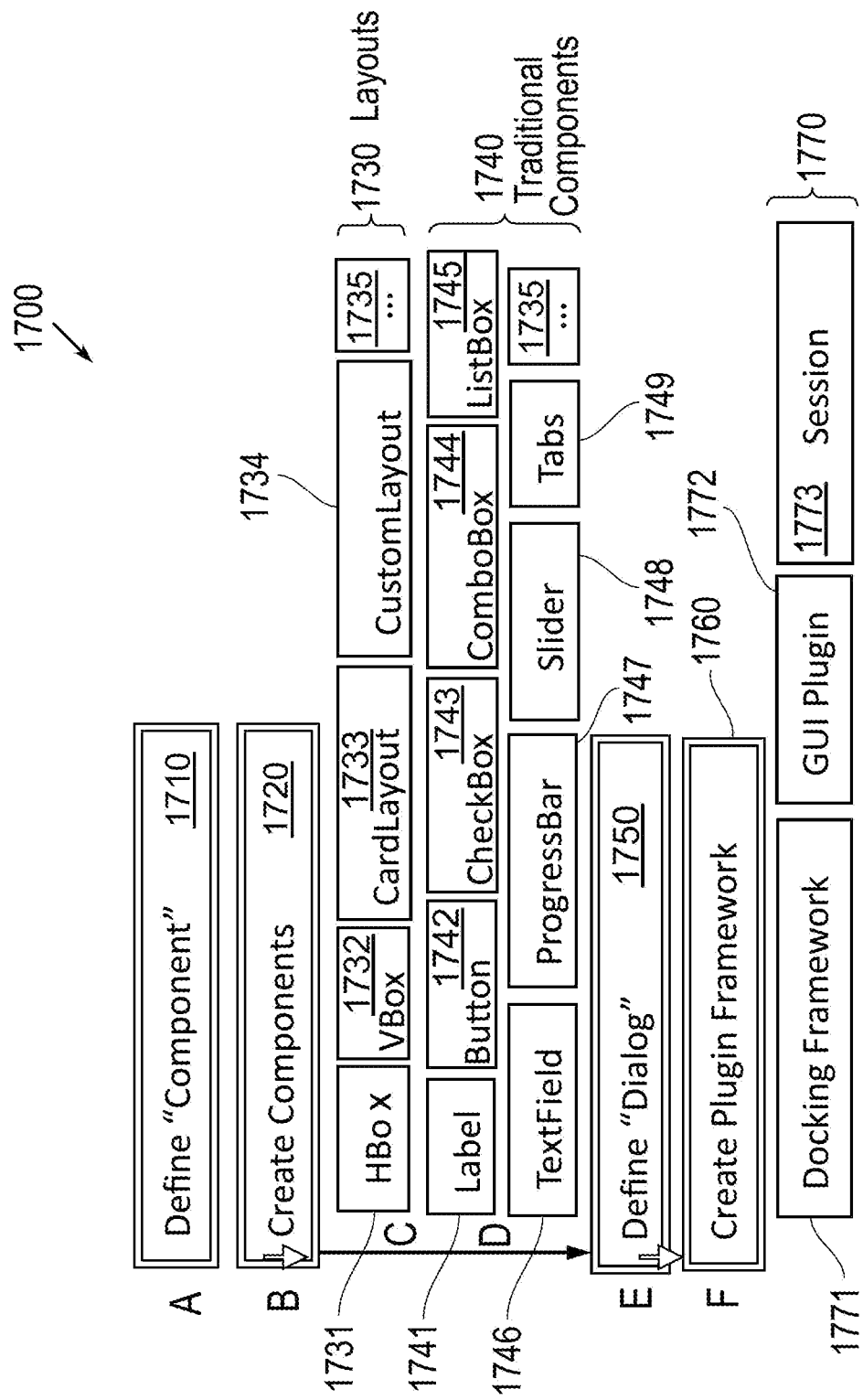
FIG. 17 is a diagram view of component levels.

FIG. 17 shows a diagram view 1700 of hierarchical components. Layer A includes component definition 1710. Layer B includes component creation 1720 and proceeds from Level A. Level C derives from Level B forms/Each such form can be represented by an icon that denotes particular visual and format characteristics as rendered by the GUI.

Layouts 1730 that includes H-Box 1731, V-Box 1732, CardLayout 1733, CustomLayout 1734 and miscellaneous 1735. Level D also derives from Level B includes traditional components 1740. These include Label 1741, Button 1742, CheckBox 1743, ComboBox 1744, ListBox 1745, TextField 1746, ProgressBar 1747, Slider 1748, Tabs 1749 and more miscellaneous 1735.

Figure 18:
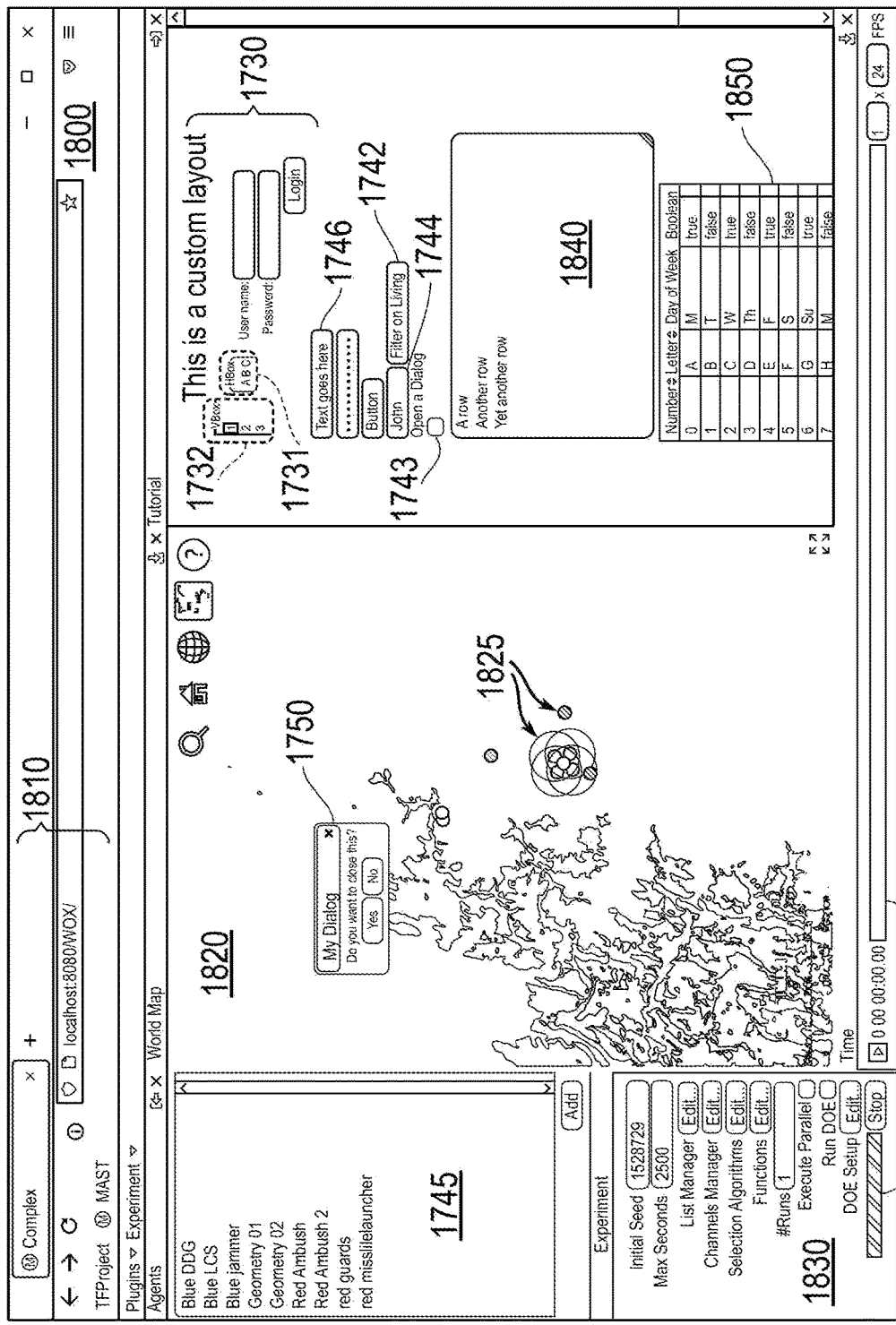
FIG. 18 is a windows view of a layout with maps and tables.

Level E proceeds from Level B and defines "Dialog" 1750. Level F proceeds from Level E and creates a Plugin Framework 1760. These produce plugin components 1770 including docking framework 1771, GUI plugin 1772 and Session 1773. FIG. 18 shows a window view 1800 of a header 1810 and a constructed map 1820. The ListBox 1745 is disposed to the left of the map 1820 that displays the Dialog box 1750 and marker dots 1825.

A manager tool 1830 also appears to the left of the map 1820 below the Listbox 1745. This tool 1830 includes a series of managers with edit buttons and a Progress Bar 1747. A slider 1748 appears below the map 1820. A custom layout 1730 with username and password dialog boxes further includes a V-Box 1732 and an H-Box 1731, as well as a TextField 1746, a Button 1742, a Checkbox 1743 and a ComboBox 1744. A row field Text Area 1840 appears below the layout 1730. A calendar table 1850 appears below the row field Text Area 1840.

FIG. 19 shows a window view 1900 of a local host display. A menu tab 1910 is displayed below the file identifier 1920 with a presentation field 1930. Login boxes for entries of user 1940 and password 1950 information, followed by a login button 1960 are shown in the field 1930. FIG. 20 shows a code view 2000 of instructions for the host window view 1900. These include a menu portion 2010 for producing the menu file identifier 1920 and a login example 2020 that includes user 1940, password 1950 and login button 1960 as H-Boxes 1731.

Layout: A "Layout" is a Component that contains child Components. Layout 1730 is responsible for positioning. For example, an "HBox" 1731 positions all Components in a horizontal line. A "VBox" 1732 positions all Components in a vertical line. As mentioned previously, the Layout 1730 is a Component. That means a Layout 1730 can contain other Layouts.

There are some important parts that make Layout special, as compared to other Components in exemplary embodiments:

The very top Layout is responsible for calling "toHtml" on all child elements, in order to construct the complete HTML.

A Layout 1730 is responsible for initializing all child Components via the "init" method, which passes the socket information (i.e., "pushContext") and the identification (ID) of the master Layout. The socket ensures that each element can push to the client, regardless of whether the operator has interacted with the page. The master layout ID is needed for when a Component throws an event.

A Layout 1730 must initialize any future Components that are added to the Layout, and that must modify the client's DOM when elements are added so that the server and client remain synchronized.

JavaServer Faces (JSF) generates a layout.xhtml composite component. This method executes a commandScript (via AJAX) as defined in the XHTML: This is shown in FIG. 3C as code 330 in respective AJAX 320 and XHTML 330 code segments. In this example, a Layout object 1730 is passed as a parameter. Segment 430 shows how a Layout parameter can be defined in XHTML. Then one can use methods found in the LayoutView bean, such as getHtml, fireEvent, etc., which finally call those methods on the given WACHOS Layout component. This associated Bean is defined as shown in FIG. 5A in code segment 530.

Returning to the earlier Button example, one may recall that the click event was defined as shown in FIG. 5B in code view 540. A Managed Bean is a regular Java Bean class registered with JSF. In other words, the Managed Bean is a Java bean managed by JSF framework. The Managed Bean contains the getter and setter methods, business logic, or even a backing bean (a bean contains all the HTML form value). A tutorial for JSF—Managed Beans is available (see https://www.tutorialspoint.com/jsf/jsf_managed_beans.htm).

In that call, the layout.xhtml's layout ID is that master layout's ID. This minimizes the number of AJAX definitions needed. The commandScript's action receives that message and executes the LayoutView's fireEvent method. The fireEvent method obtains the parameter ID that fired the event, in addition to the value of the event. The master layout is then used to recursively find the Component 1720 and execute the event on the server side.

This example algorithm demonstrates the recursive approach of finding the component by its ID in concatenated FIG. 6A as code view 600, 6B as code view 610 and 6C as code view 620 as an instruction sequence. FIG. 6A includes segments 630 and 640. FIG. 6B includes segments 650, 660, 670 and 680. FIG. 6C includes segment 690. In views 600, 610 and 620 show the component by its ID via recursively searching for it. Once found in the provided Layout (or nested Layout), the "value" is executed as the parameter of the fireEvent call. In other words, when the "Button" component (or any other type) is found, its "fireEvent (value);" method is called. That value is a String that may contain information relevant to the event that has been fired.

Dynamically Add/Remove Components: As mentioned earlier, a given Layout is responsible for efficiently adding/removing components. Because one always monitors the IDs, one can employ something like jQuery to modify a given layout on the client side.

A very simple Layout 1730, known as an "HBox" (or Horizontal Box) 1731 can be described. In an HBox 1731, all Components 1740 are displayed on a single line. In the exemplary proof-of-concept, the HTML 310 of an HBox 1731 is simply a table with a single row. FIGS. 7A and 7B as code views 700 and 710 provide an example of adding Components 1740 to an HBox 1731 with the WACHOS paradigm. FIG. 8 as code view 800 provides an example of removing Components 1740 from an HBox 1731 with the WACHOS paradigm.

Dialogs: In WACHOS, a Dialog is not a Component. Instead, there is a div in the HTML with an ID of "dialogsContainer", where an HTML dialog becomes added on creation or removed when disposed. Dialogs can only be created-or-destroyed by a Layout 1730. In the proof of concept, one can employ the jQuery Dialog widget. FIG. 9A as code view 900 provides example instructions for the "findComponentAndFireEvent" method.

Component Library Summary-Drawing: With this definition, one can execute all the GUI operations on the Java side without the operator needing to understand AJAX or web sockets. Here is an example usage of the previously discussed composite Component, where tf.layout would be one's Java-defined Layout as shown in FIG. 9B as code view 910. All the heavy lifting can now be performed in Java. For example, let's assume that tf.layout was produced by Java code with the GUI executed in the browser, after the operator has pressed the button three times in FIG. 9C as code view 920.

A visual diagram in FIG. 11 as windows view 1100 shows how this approach functions. One should note the presence of only one AJAX entry point to fire an event in FIG. 12A of view 1200. There is only one socket used to update the HTML from the server side as shown in FIG. 12B of view 1210.

This is excellent design from a cybersecurity point of view; the socket of view 1210 in this example is single-direction. The socket can only transit from the server 1650 to the client in browser 1660, not the other way around. The AJAX (commandScript) in this example can only go from the client to the server when an event is executed. Such events are well defined, and one can address security concerns on any events' content before interpreting them in the server 1650.

Essentially, there's a top "layout" 1730 that operates a "toHtml" method. Calling a Layout's toHtml method acts on all of the components it contains. If any of those components are a Layout, then that Layout's toHtml method will call the routine toHtml on all of its components. All components in the master Layout are generated toHtml with knowledge of that master Layout, which facilitates and expedites a TextField 1746 or Button 1742, etc. to remember where to call back to the server upon executing an operator's interaction event.

There is only one AJAX entry point, in particular the master Layout that all components are found in Create Components 1720. When JavaScript is called from the client to execute this commandScript (AJAX) on the server, that call knows that its name is "changed [masterLayoutId]". See FIG. 12A as view 1200 for these instructions:

```
<o:commandScript name="changed#{cc.attrs.layout.id}"
    action="#{layout.fireEvent(cc.attrs.layout)}"/>.
```

Sending JavaScript via socket from the server to the client is accomplished through FIG. 12B in view 1210 for these instructions:

```
<o:socket channel="socketChannel" scope="view"
    onmessage="function(message) { eval(message); }"/>
```

That is the socket definition. On the Java side, a matching socket "pushContext" variable gets passed to every WACHOS Component 1720. All WACHOS Components are aware and can use the matching socket variable to communicate with the client.

Plugin Framework: All of this arranges conveniently for a plugin framework 1760 approach. In a language such as Java, there are several popular plugin architectures. In the proof of concept, the plugin framework developed for the OSM library could be used. One can create a WACHOS plugin for Java with instructions that resemble code view 1300 as shown. A WachosPlugin creates a WACHOS Layout object. This plugin doesn't need to follow any complications defined by JSF. The plugin doesn't even need to recognize that JSF exists. Its only job is to create a Layout 1730 and provide a title.

The Session object 1773 that passes into the createLayout method is relatively simple. The object provides a Map<String, Object> of properties that can be shared across all plugins. For plugins to affect each other, one can also implement a publish-or-subscribe approach in the Session object, i.e., one plugin subscribes to a property named "pizza" and another plugin publishes a change to that "pizza" property. This was omitted in the prototype, because due to use of publish or subscribe approaches already defined in the OSM library.

A docking framework 1771 can be used to organize the GUI components. There are several popular docking frameworks for the web. In the WACHOS proof-of-concept, wcDocker was chosen. With wcDocker, one can simply specify a docking area by adding HTML to it. In WACHOS, that HTML for a given docking element is provided by the plugin's Layout. FIG. 14 showing web view 1400 illustrates an example of the functionality of a docking framework. The main takeaway of how one works can be found on stackoverflow: "A docking framework enables one to organize kinds of "subwindows" inside another window (think of InternalFrames but more flexible). The exemplary GUI is very flexible and the end user can reorganize it. In the exemplary case, the content of every subwindow is generated by a WACHOS plugin.

The objective was to produce a docking framework where one could write GUI plugins and join them into a single web application. The plugin/docking framework portion of this invention is fairly simple, but it is only made simple because of the WACHOS pattern. Also, it turns out that the WACHOS pattern is extremely useful in and of itself.

Advantages of WACHOS embodiments include:

This approach can be applied to any server-side object oriented language. WACHOS code in the proof of concept is using JSF, and WACHOS is completely compatible with JSF code.

For an operator using JSF as the underlying architecture, that framework can be switched to Java Spring without modifying the code that developers have written with the WACHOS library. This is very portable, as WACHOS prevents exclusively locking into a given technology. Further, the operator is not "locked in" to WACHOS. The proof of concept demonstrates that one can seamlessly incorporate traditional JSF with WACHOS.

There is no existing capability that enables a developer to independently write desktop-like GUI code as a plugin and join that with other GUI plugins to form a complete web application in a docking framework.

Conventionally, there is no convenient technique to perform a dynamic application in a JSF application. This further applies to other languages on the server. In fact, an operation as simple as dynamic form elements is ridiculously complex in JSF. See https://stackoverflow.com/questions/3510614/how-to-create-dynamic-jsf-form-fields. The "TaserFaces" technique demonstrates how to extend the "ui:repeat" approach to its practical limit. The result is inefficient, as new Component types can only be added when included in the repeat block in XHTML 330.

Exemplary embodiments can greatly simplify web application development. There are companies that build their entire business around technology that is meant to simplify web development. Competing applications to the exemplary WACHOS embodiments include:

Vaadin: enables Java GUI code to be written on the server side for web development; not easily extensible; cannot use it to create plugins for a docking framework.

NetBeans Platform Architecture: enables GUI modules (plugins) to be developed separately and joined together in the NetBeans docking framework. It is strictly for desktop application development.

MAST (Modeling and Simulation ToolBox): Built on the OSM framework, this enables GUI plugins to be developed separately and joined together. Plugins are for desktop only, but exemplary embodiments demonstrate how to change that.

Liferay Portal: provides a "plugin-based" approach for adding JSF portlets. This is quite deficient from WACHOS, and is not geared towards placing true plugins in a docking framework. Instead, Liferay has the operator deploy each portlet to the web application. Then, each portlet can be accessed from the left-hand side. Nothing else exists that enables a programmer to develop a web GUI as a plugin entirely in Java and load it dynamically in a web application.

Alternative 1: Write directly in JSF. Note that JSF is a Java EE standard, and it has many great features. However, JSF is difficult to learn. In particular, people tend to struggle with the intricate relationship of Java and XHTML 330. To get everything just right, XHTML is fickle, particularly when developing an interactive web "application"—something that responds to user interaction and is also dynamic. For this reason, operators typically use JSF to create a web "page"—something that is mostly static and responds very little to that interaction.

Alternative 2: Use PrimeFaces DynaForm. DynaForm enables the developer to define all components in XHTML like a normal JSF GUI, but it enables data to drive the GUI in the Java backing bean. This approach does not remove the need to understand XHTML in any way and does not really address what the exemplary TaserFaces inclusive process addresses.

Alternative 3: Use a Different Web Technology. Other web technologies each have their own shortcomings where the goal is to maintain an existing JSF application, write the GUI in Java, or do everything on the server side.

In particular, Vaadin is similar to JSF in being a server-side web architecture. This means that the HTML code (GUI) is built on the server side and then sent to the client. Vaadin is great for developing a web application. Vaadin even feels like writing a Java Swing/JavaFX GUI, but does have some disadvantages. For one, Vaadin is enormous. This is because it is an entire solution and does not leverage the Java EE standard solution (JSF). Further, there are difficulties in integrating Vaadin with JSF—its glitches cause behavior to resembling a Frankenstein's monster. Thus, many JSF projects are being rewritten from scratch or abandoned altogether. This is not necessary with WACHOS. The exemplary TaserFaces offers the simplicity of Vaadin, but with a better way to integrate, producing the same exact JSF components that already exist in your project.

As further alternatives, Angular, Vue, React, etc. are technologies that leverage the REST approach. These technologies are client-based in nature, meaning the GUI is generated on the client side (not generated on the server and served to the client). This is a good approach for many applications, but it does have some drawbacks. For instance, there are security concerns that must be considered and mitigated in a client-based architecture. In addition, low power devices are asked to do more processing with a client-based architecture.

Regarding prior developments, TaserFaces defines JSF composite components that are essential to the way exemplary embodiments operate. In an exemplary prototype, components were primarily wrapped from the PrimeFaces library. Although PrimeFaces is not part of the Java EE spec, it has become extremely popular. Whenever someone uses JSF, one can often assume that they are also using PrimeFaces, which is an option on which exemplary embodiments can operate independently.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A web application creation system for executing computer-implemented instructions from a server platform in a first language to build a graphical user interface (GUI) on a client platform in a second language, said system comprising:
 - a GUI library containing a plurality of GUI components, each GUI component including a toHTML( ) instruction that recursively generates HTML/JavaScript code for rendering said each GUI component on the client platform;
 - a server environment on the server platform for organizing said plurality of GUI components, such that behavior of said each GUI component is described using the first language;
 - a server application on the server platform for dynamically generating said HTML/JavaScript code from server logic based on said GUI library, wherein the server platform renders the GUI for the client platform;
 - a client application on the client platform that receives said HTML/JavaScript code from the server platform for rendering said plurality of GUI components;
 - a first communication layer that enables interaction between the server platform and the client platform via a WebSocket endpoint, wherein said each GUI component is capable of invoking behavior on the client platform via an exec(String javascript) instruction;
 - a second communication layer that facilitates client-to-server interaction through an asynchronous JavaScript and XML (AJAX) endpoint, where the client platform sends event information to the server platform, including a unique component identifier to the server platform responsive to an external event with said GUI components;
 - a recursive event handling system on the server that processes incoming said external event, traverses a component hierarchy to identify said GUI component that triggered said external event, and executes corresponding logic on the server platform for that GUI component; and
 - a plugin framework on the server platform that enables developers to create a plurality of GUI plugins that the server platform dynamically combines into a unified web application, with the arrangement, interaction, and docking behavior of the GUI components managed by the client platform.

2. The system of claim 1, wherein the server platform recursively processes a plurality of events, starting from the affected identifier of said each GUI component, traversing a hierarchy on said plurality of GUI components to identify the component that initiated a trigger event among said plurality of events, and executing the corresponding an action on the server platform based on said each GUI component.

3. The system of claim 1, wherein a server-to-client communication is performed via a single WebSocket, wherein the server platform sends JavaScript execution instructions to the client platform using said exec (String javascript) instruction for rendering and handling interactions; and a client-to-server communication is performed via said AJAX endpoint, such that the client platform sends said unique component identifier to the server platform.

4. The system of claim 1, further comprising: a plugin framework on the server platform to define a plurality of GUI plugins, which the server platform dynamically integrates into a unified web application; a docking framework on the client platform that manages the behavior of said GUI components, including their arrangement, interaction, docking, undocking and repositioning from said client platform.

5. The system of claim 1, wherein said each GUI component is defined using the first language, and the toHTML( ) instruction automatically generates the corresponding HTML/JavaScript code necessary to render said each GUI component on the client platform in the second language.

* * * * *